April 13, 1965   M. B. SAMPSON   3,178,192
ADJUSTABLE UNIVERSAL CHUCK
Filed Feb. 7, 1963
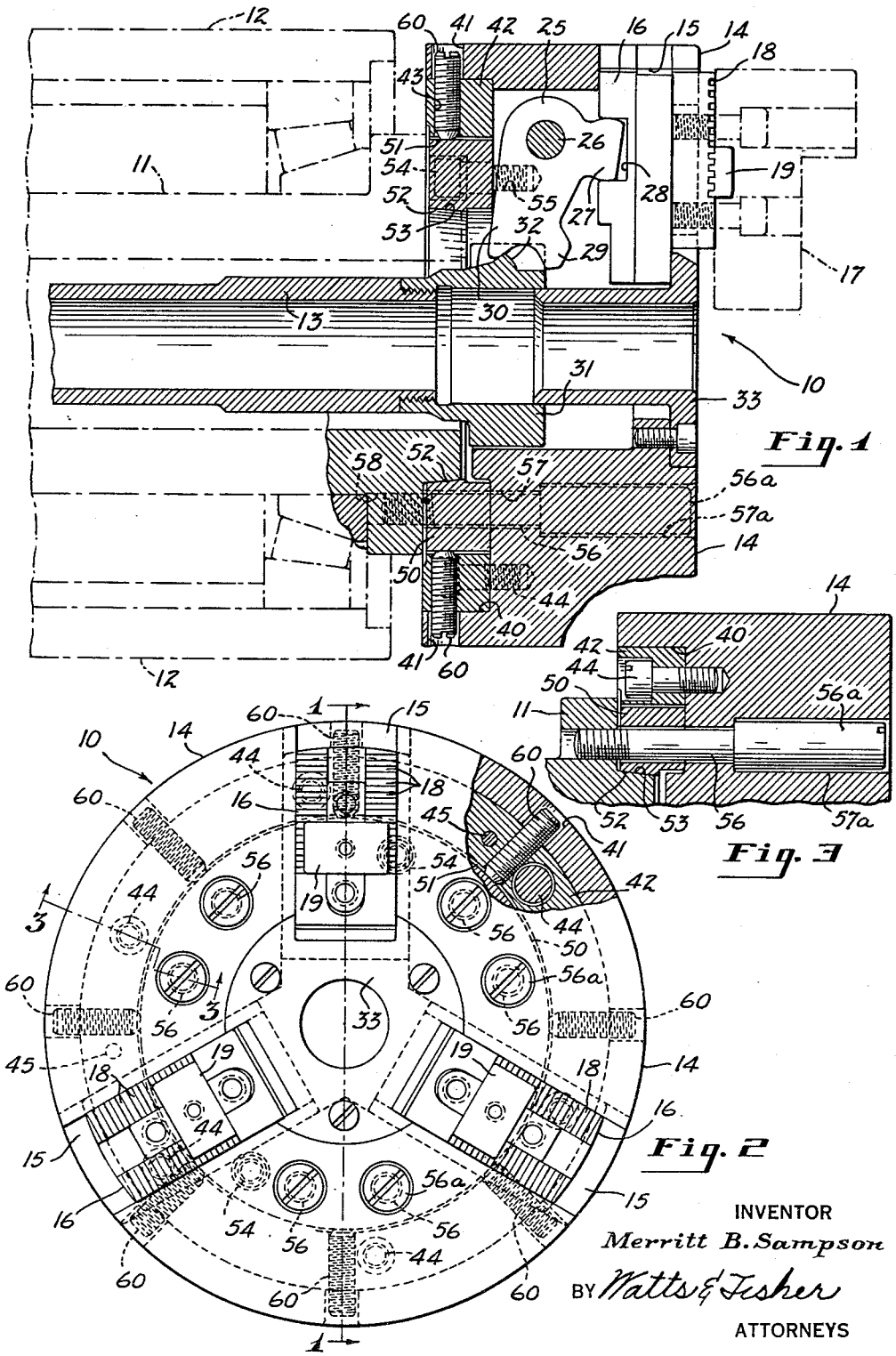
INVENTOR
Merritt B. Sampson
BY Watts & Fisher
ATTORNEYS

United States Patent Office 3,178,192
Patented Apr. 13, 1965

3,178,192
ADJUSTABLE UNIVERSAL CHUCK
Merritt B. Sampson, Shaker Heights, Ohio, assignor to
The S-P Manufacturing Corporation
Filed Feb. 7, 1963, Ser. No. 257,002
11 Claims. (Cl. 279—6)

This invention relates generally to adjustable universal chucks, and more specifically to a new and improved universal jaw chuck assembly including adjustable mounting structure for connecting the chuck to the spindle of a machine tool.

The two most common types of chucks used in conjunction with machine tools, such as lathes, may be classified as being independent chucks and universal chucks. The jaws of independent chucks are individually adjustable so that a high degree of centering accuracy can be obtained. However, this type of chuck is not adapted for production work because of the time which is required to adjust the jaws and center the workpiece in each chucking operation.

In universal chucks, all of the jaws are movable simultaneously to close on a fixed center point and are usually actuated by either a scroll mechanism or, in the case of power chucks, by a machine draw tube. Since the jaws can be actuated simultaneously, considerably less centering time is required than with independent chucks and, therefore, universal chucks are more desirable for production work. The primary disadvantage of universal chucks has been the difficulty in providing precise accuracy in centering the work relative to the axis of the spindle to which the chuck is connected.

Since the jaws of a universal chuck close on a fixed center point, the chuck must be accurately fabricated so that the jaws will closely center the workpiece. Such precise fabrication is difficult and expensive to obtain. Further, when universal chucks are used, the jaws and the jaw closing mechanism necessarily become worn. A small amount of wear of either the jaws or the jaw closing mechanism shifts the center point to which the jaws close and, therefore, destroys the centering accuracy of the chuck.

Several expedients in both the use and construction of universal chucks have been resorted to in the past in attempts to overcome the foregoing difficulties. One such expedient has been to rough machine the work in a universal type chuck and then perform the finishing operations using another chuck. Another expedient has been to remachine or grind the jaws in the chuck in an attempt to restore its original accuracy. However, since the jaw-actuating mechanism also becomes worn through use, the practice of grinding the jaws is satisfactory only for workpieces of a single size. When different sized workpieces are to be chucked, the jaws must be reground or different jaws placed in the chuck. The practice of machining the jaws also is time-consuming and results in considerable down-time, since it is necessary to machine the jaws in the chuck while it is mounted on the machine tool.

Various mounting structures for universal chucks also have been devised in attempts to correct eccentricity of the jaws with respect to the axis of the machine tool spindle. One of these prior art constructions contemplates an adapter flange which is secured to the spindle. The body of the chuck is connected to the adapter by axial bolts extending through the jaw face and by radial adjustment screws which are carried by the body in engagement with the flange. In use, the radial screws are adjusted to move the chuck body relative to the adapter, while flexing the axial mounting bolts. One disadvantage of this arrangement is that considerable stress is transmitted to the chuck body, as indicated by the flexing of the mounting bolts. Because of these stresses, permanent radial adjustment of the chuck is difficult to obtain and constant re-adjustment usually is required. Moreover, since it is required to flex the mounting bolts when making the radial adjustment, it is difficult to turn the adjusting screws and accurately to locate the chuck body.

The prior art adjustable mounting structures, such as described above, have been limited to use in universal chucks wherein the jaws are reciprocated by a wedge-type operating mechanism. There has been no known power actuated, lever-operated type universal chuck assembly which embodies structure for adjusting the jaws and centering the work relative to the spindle axis of a machine tool. Since the gripping power of a wedge-operated chuck assembly is often insufficient for performing rough cutting operations, the conventional constructions can be used in many applications only for finish machining. Consequently, it has been necessary to use the customary lever-operated chuck for rough machining and then re-chuck the work in an adjustable, wedge-operated chuck for the finishing operations.

The present invention overcomes the foregoing disadvantages heretofore associated with universal chucks by providing a new and improved adjustable mounting construction for accurately centering the jaws with respect to the spindle axis of a machine tool. The radial adjustment of the jaw chuck assembly of this invention can be quickly and easily carried out with precise accuracy. As a result, the chuck is ideally suited for production work and can be used to chuck workpieces of different sizes for precise machining operations. At the same time, the novel chuck assembly is of relatively simple and inexpensive construction.

As will hereinafter be described in detail, the invention is particularly adaptable to power-actuated, lever-operated universal chucks. Because of the high gripping power which can be effected by this type of chuck there is provided a novel chuck assembly which is capable of holding the work with the power required for rough machining and, as noted above, with the preciseness necessary for finishing operations. Consequently, the invention makes it possible to avoid the undesirable prior practice of using at least two different chucks when completely machining the work.

In its preferred form, the chuck assembly construction generally comprises a jaw chuck body having a cylindrical, coaxial recess in its end faces adjacent the machine tool spindle. A mounting ring is positioned in the recess and is provided with a plurality of radial adjustment screw openings. An adapter ring is disposed within the mounting ring in surrounding engagement with the spindle, and is formed with an outer diameter which is less than the inner diameter of the mounting ring. Adjustment screws are mounted through the screw openings in engagement with the adapter ring for radial adjustment of the adapter ring relative to the mounting ring. The chuck assembly is adapted to be connected with the spindle by headed spindle bolts which extend through enlarged bolt openings in the chuck body and adapter ring into threaded engagement with the spindle.

In use, the spindle bolts are loosened and the radial screws are adjusted to center the jaws relative to the spindle axis. The spindle bolts are then tightened and the chuck is ready for use. As will be apparent from this description, the adjusting operation can be easily and simply performed. Since the radial stress is primarily transmitted to the mounting ring instead of through the chuck body and the mounting bolts, the adjustment of the radial screws can be accurately controlled. Further, the adjustment is of a permanent character.

Other features and advantages of the invention will become apparent from the following detailed description when taken in conjunction with the accompanying drawings.

In the drawings:

FIGURE 1 is a cross-sectional view taken on the line 1—1 of FIG. 2 and shows the novel chuck assembly connected to the spindle of a conventional machine tool;

FIGURE 2 is a front elevational view of the chuck assembly; and

FIGURE 3 is a fragmentary, cross-sectional view taken on the lines 3—3 of FIG. 2.

Referring now to the drawings, the invention is shown for the purposes of illustration as being embodied in a power-actuated, lever-operated jaw chuck. While the invention has particular utility in such a chuck, it is to be understood that it also can be employed to advantage in other universal chuck designs, such as scroll chucks and wedge-operated chucks.

The lever-operated jaw chuck is generally indicated by reference numeral 10. As shown in FIG. 1, the chuck 10 is connected to the spindle 11 of a conventional machine tool. The spindle 11 is journaled in the head stock 12 of the machine tool, and a draw tube 13 extends through the spindle and is connected to a draw bar (not shown) which extends from a rotary linear actuator (also not shown) fastened to the end of the machine spindle. As will be understood by those skilled in the art, the draw tube 13 is rotatable with the spindle and is axially reciprocable by the rotating linear actuator.

The chuck 10 generally includes a chuck body 14 having ways 15 formed in its jaw face. A master jaw slide 16 is mounted for radial reciprocation in each way and to these slides are fastened the work jaws 17 (FIG. 1) for gripping the work. As shown, the slides 16 have serrations 18 on their faces and the work jaws are keyed to these serrated faces by master keys 19 in order to provide for multiple work jaw adjustments. For purposes of clarity, the work jaws 17 have not been shown in FIG. 2, although it will be recognized that the master keys normally are not mounted on the master slides without the work jaws.

A plurality of levers 25 corresponding in number to the slides 16 are pivotally mounted in the body 14 by lever pins 26. An arm of each of the levers has a knob 27 which is engaged in a recess 28 of the jaw slide with which the lever is associated. The other arm of each lever has a cam surface including spaced projections 29 and 30. A cam ring 31 is threaded on the forward end of the draw tube 13. The cam 31 has milled profiles which cooperate with the projections 29, 30 of each lever to pivot the levers and radially move the jaw slides 16 when the draw tube is reciprocated. A dust bushing 33 also is provided and may be used as a pilot for a boring bar or the like.

In accordance with this invention, the end face of the chuck body adjacent the spindle 11 is formed with a cylindrical, coaxial recess 40. The chuck body 14 also is provided with a plurality of radial holes 41 which communicate with the recess 40. According to the preferred construction, eight such holes are provided, although a smaller or greater number can be formed, if desired.

A mounting ring 42 is positioned in the recess 40 and has a plurality of radial screw openings 43 which are aligned with the radial holes 41 of the body. In the embodiment shown, the mounting ring 42 is connected to the chuck body 14 by axial bolts 44 which extend through holes in the ring into threaded engagement with the body. The chuck body and the mounting ring also may be provided with aligned dowel pin holes in which locating pins 45 are inserted.

An adapter ring 50 is positioned within the mounting ring 42. The outer diameter of the adapter ring 50 is smaller than the inner diameter of the mounting ring in order to provide radial adjusting space 51. The inner surface 52 of the adapter ring is tapered axially inwardly of the chuck body and is in surrounding engagement with a correspondingly tapered surface 53 of the spindle 11. According to the preferred construction, the adapter ring 50 is loosely connected to the chuck body by shoulder bolts 54 in order to hold the ring in the recess 40 when the chuck is disconnected from the spindle. To this end, the adapter ring is formed with axial bolt holes which are counterbored from the spindle face of the ring. The shoulder bolts 54 are inserted through these holes into threaded bores 55 in the chuck body so as to provide for limited movement of the adapter ring relative to the mounting ring 42 during radial adjustment of the chuck. As shown most clearly in FIG. 1, the shoulders of the bolts 54 are in engagement with the chuck body at the bottom of the recess 40.

The entire chuck assembly 10 is connected to the spindle 11 by axial spindle bolts 56 which extend through bolt openings 57 in the body and adapter ring into engagement with the threaded bores 58 formed in the face of the spindle. The bolt openings 57 have a diameter greater than the spindle bolts and are counterbored at 57a from the jaw face of the body. The spindle bolts 56 are uniquely formed with elongated heads 56a which preferably are longer than one-half of the thickness of the chuck body. Because of this construction, the chuck assembly can be firmly secured to the spindle and flexing of the bolts prevented so that, in use, the chuck will not move from its adjusted position.

Radial adjustment of the chuck is obtained by adjusting screws 60 which are mounted through the tapped holes 43 of the mounting ring 42 into engagement with the adapter ring 50. When adjusting the chuck assembly, the workpiece to be rotated is held between the jaws 17 and the draw tube 13 is retracted, as shown in FIG. 1, resulting in radial jaw force on the workpiece and holding of the chuck against the spindle 11. Assuming that the axis of the work is eccentric with respect to the axis of the spindle 11, as may be determined by use of a suitable indicator, the spindle bolts 56 are then loosened preparatory to adjusting the screws 60. Preferably, every other screw 60 is numbered around the circumference of the chuck body 14. The adjusting operation is performed by loosening the four unnumbered screws and then loosening a selected numbered screw and tightening the opposite numbered screw. The concentricity of the work with respect to the axis of the spindle is again checked by use of the indicator and, if necessary, the adjusting operation is repeated until the work is properly positioned. In the final position of adjustment, the unnumbered screws are tightened to distribute the stresses through the mounting ring and the spindle bolts are tightened to again secure the chuck on the spindle.

It will be apparent from the above description that novel construction of this invention provides for a precise adjustment operation of a universal chuck, and particularly a power-actuated, lever-operated jaw chuck. Because of the fact that the radial adjustment screws are carried by a separate mounting ring which is reinforced by the chuck body, considerable leverage can be exerted when adjusting the screws. Further, when this adjustment is performed, any resulting stresses are primarily carried by the separate mounting ring and flexing of the spindle bolts are eliminated. As a result, the chuck can be used to hold workpieces of a particular size without requiring readjustment and without grinding of the jaws or any of the conventional expedients heretofore employed. When different sized workpieces are to be chucked, the precise adjustment can be quickly and easily repeated with minimum down-time.

Many variations and modifications of the invention will be obvious to those skilled in the art in view of the foregoing detailed disclosure. Therefore, it is to be understood that, within the scope of the appended claims, the invention can be practiced otherwise than as specifically shown and described.

What is claimed is:

1. In a machine tool having a spindle, the combination of a jaw chuck mounted on said spindle, said jaw chuck comprising a chuck body, a mounting ring in engagement with the end of said body adjacent said spindle, said mounting ring having a plurality of radial openings, adjusting means mounted through said openings, means on said spindle engaged by said adjusting means, said means on said spindle being radially smaller than the inner diameter of said mounting ring so that said mounting ring can be radially adjusted relative to said spindle, and means connecting said chuck to said spindle.

2. In a machine tool having a spindle, the combination of a jaw chuck mounted on said spindle, said chuck comprising a body having a cylindrical, coaxial recess in its end face adjacent said spindle, a mounting ring positioned in said recess, and connected to said body, said mounting ring including a plurality of radial screw openings, an adjusting screw mounted through each of said screw openings, means on said spindle engaged by said adjusting screws, said means on said spindle being radially smaller than the inner diameter of said mounting ring so that said mounting ring can be radially adjusted relative to said spindle, and means connecting said chuck to said spindle.

3. In a machine tool having a spindle, the combination of a jaw chuck assembly mounted on said spindle, said chuck assembly comprising a chuck body, a plurality of radially movable jaw slides carried by said body, a plurality of levers pivotally mounted in said body and in operative engagement with said slides, said machine tool including means for pivoting said levers and thereby actuating said slides, a mounting ring in fixed engagement with the end of said body adjacent said spindle, said mounting ring having a plurality of radial screw openings, an adapter ring positioned in said mounting ring in surrounding engagement with said spindle, said adapter ring having an outer diameter less than the inner diameter of said mounting ring, an adjusting screw mounted through each of said screw openings in engagement with said adapter ring for radial adjustment of said body relative to said adapter ring, and means connecting said chuck to said spindle.

4. In a machine tool having a spindle, the combination of a jaw chuck assembly mounted on said spindle, said assembly comprising a chuck body, a plurality of radially movable jaw slides carried by said body, a plurality of levers pivotally mounted in said body and in operative engagement with said slides, said machine tool including means for pivoting said levers and thereby actuating said slides, a mounting ring in fixed engagement with the end of said body adjacent said spindle, said mounting ring having a plurality of radial screw openings, an adapter ring positioned in said mounting ring in surrounding engagement with said spindle, said adapter ring having an outer diameter less than the inner diameter of said mounting ring, an adjusting screw mounted through each of said screw openings in engagement with said adapter ring for radial adjustment of said body relative to said adapter ring, means forming a plurality of axial bolt openings through said body and said adapter ring, said spindle having threaded bores aligned with said bolt openings, headed spindle bolts extending through said bolt openings in engagement with said bores, said spindle bolts having a diameter less than said bolt holes to permit said radial adjustment, and said spindle bolts being formed to resist flexing thereof so that said body will not move from an adjusted position to said body, said connecting means permitting limited axial movement of said adapter ring.

5. The combination as claimed in claim 4 wherein said chuck body includes a cylindrical, coaxial recess in said end face, and wherein said mounting ring is positioned in said recess.

6. In a machine tool having a spindle, the combination of a jaw chuck mounted on said spindle, said chuck comprising a body having a cylindrical, coaxial recess in its end face adjacent said spindle, a plurality of radially movable jaw slides carried by said body, a plurality of levers pivotally mounted in said body and in operative engagement with said slides, said machine tool including means for pivoting said levers and thereby actuating said slides, a mounting ring positioned in said recess in engagement with said body, said mounting ring including a plurality of radial screw openings, an adapter ring disposed in said mounting ring in surrounding engagement with said spindle, said adapter ring having an outer diameter less than the inner diameter of said mounting ring, adjusting screws mounted through said screw openings in engagement with said adapter ring for radial adjustment of said body relative to said adapter ring, and means connecting said chuck to said spindle.

7. In a machine tool having a spindle, the combination of a jaw chuck mounted on said spindle, said chuck comprising a body having a cylindrical, coaxial recess in its end face adjacent said spindle and a plurality of radial holes extending into said recess, a plurality of radially movable jaw slides carried by said body, a plurality of levers pivotally mounted in said body in operative engagement with said slides, said machine tool including means for pivoting said levers and thereby actuating said slides, a mounting ring positioned in said recess and fixed to said body, said mounting ring having a plurality of radial screw openings aligned with said radial holes, an adapter ring disposed in said mounting ring in surrounding engagement with said spindle, said adapter ring having a smaller outer diameter than the inner diameter of said mounting ring, adjusting screws mounted through said screw openings in engagement with said adapter ring for radial adjustment of said body relative to said adapter ring, means forming a plurality of axial bolt openings through said body and said adapter ring, said spindle having threaded bores aligned with said bolt holes, and a headed spindle bolt extending through each of said bolt holes into engagement with said bores, said spindle bolts having a smaller diameter than said bolt holes to permit said radial adjustment.

8. In a machine tool having a spindle and an axially reciprocal draw tube in said spindle, the combination of a chuck mounted on said spindle, said chuck comprising a body having a cylindrical, coaxial recess in its end face adjacent said spindle and a plurality of radial holes extending through said body into said recess, a plurality of radially movable jaw slides carried by said body, a plurality of levers pivotally mounted in said body, said levers being operatively connected to said jaw slides and to said draw tube, a mounting ring positioned within said recess in engagement with the inner wall surface of said body, said mounting ring having a plurality of radial screw openings aligned with said radial holes in said body, a plurality of bolts securing said mounting ring to said body, an adapter ring mounted within said mounting ring, said adapter ring having an outer diameter less than the inner diameter of said mounting ring and a tapered inner surface in surrounding engagement with a correspondingly tapered inner surface of said spindle, means forming axial bolt holes through said adapter ring, headed bolt means extending through said axial bolt holes into threaded engagement with said body, said bolt means permitting limited movement of said body relative to said adapter ring, adjusting screws mounted through said screw openings into engagement with said adapter ring for radial adjustment of said body relative to said adapter ring, means forming a plurality of axially extending bolt openings through said body and said adapter ring, said spindle having threaded bores aligning with said bolt openings, and a head spindle bolt extending through each of said bolt openings into engagement with said bores, said spindle bolts having a diameter less than said bolt openings to permit said radial adjustment and elongated heads having a length approximately one-half the thickness of said body, whereby said spindle bolts resist flexing movement because of said radial adjustment.

9. A jaw chuck assembly comprising a chuck body, said body having a jaw face and an opposite face, a plurality of radially movable jaw slides mounted in said jaw face, a plurality of levers pivotally mounted in said body and in operative engagement with said slides, said opposite face being formed with a cylindrical coaxial recess, a mounting ring positioned within said recess and connected to said body, said mounting ring being provided with a plurality of radial openings, and radial adjusting means mounted through said openings for radial adjustment of said mounting ring when said chuck assembly is connected to a machine tool spindle.

10. A jaw chuck assembly comprising a chuck body, a mounting ring on one end of said body, adapter means arranged within said mounting ring, said adapter means being radially smaller than said mounting ring, adjusting means carried on said mounting ring in radial engagement with said adapter means, and means connecting said adapter means to said body, said connecting means permitting limited movement of said adapter means relative to said body.

11. A jaw chuck assembly comprising a chuck body having a cylindrical, coaxial recess in an end face and a plurality of radial holes extending into said recess, a plurality of radially movable jaw slides carried by said body, a plurality of levers pivotally mounted in said body and in operative engagement with said slides, a mounted ring having a plurality of radial screw openings aligned with said radial holes, an adapter ring positioned within said mounting ring, said adapter ring having an outer diameter less than the inner diameter of said mounting ring, an adjusting screw mounted through each of said screw openings in engagement with said adapter ring, means forming axial bolt holes through said adapter ring, headed bolt means extending through said bolt holes in threaded engagement with said body, said adapter ring being movable on said bolt means, and means forming aligned, axial bolt openings through said chuck body and said adapter ring, whereby said chuck assembly can be connected to a machine tool spindle by headed spindle bolts.

References Cited by the Examiner
UNITED STATES PATENTS

| | | | |
|---|---|---|---|
| 2,524,468 | 10/50 | Ouimette | 279—6 |
| 2,639,157 | 5/53 | Buck | 279—6 |
| 2,763,488 | 9/56 | Buck | 279—6 |
| 2,867,443 | 1/59 | Swanson | 279—119 |
| 2,984,494 | 5/61 | Alston | 279—6 |

FRANK SUSKO, *Primary Examiner.*

ROBERT C. RIORDON, *Examiner.*

UNITED STATES PATENT OFFICE
CERTIFICATE OF CORRECTION

Patent No. 3,178,192                                       April 13, 1965

Merritt B. Sampson

It is hereby certified that error appears in the above numbered patent requiring correction and that the said Letters Patent should read as corrected below.

Column 5, lines 65 and 66, strike out "to said body, said connecting means permitting limited axial movement of said adapter ring".

Signed and sealed this 5th day of October 1965.

(SEAL)
Attest:

ERNEST W. SWIDER
Attesting Officer

EDWARD J. BRENNER
Commissioner of Patents